Aug. 15, 1967
J. W. FULLER
3,336,462
ELECTRIC SOLDERING IRON HAVING A
THERMALLY INSULATED HANDLE
Filed Aug. 26, 1964
2 Sheets-Sheet 1
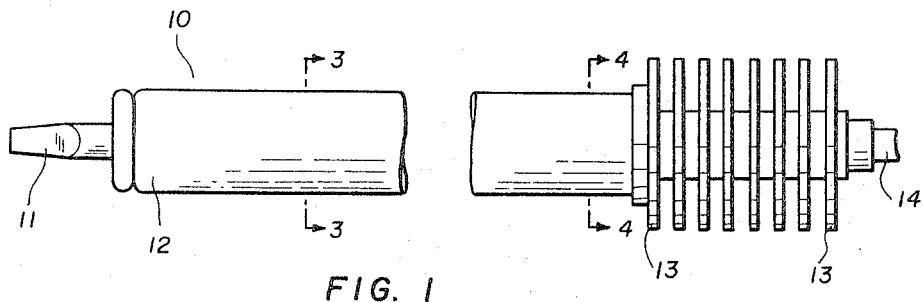
FIG. 1
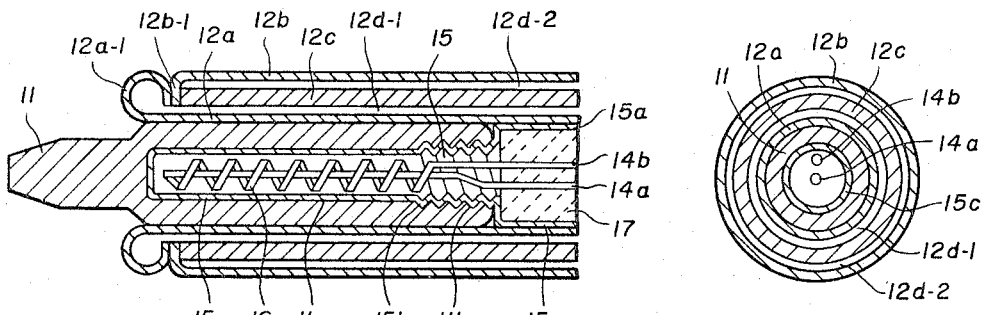
FIG. 2
FIG. 3
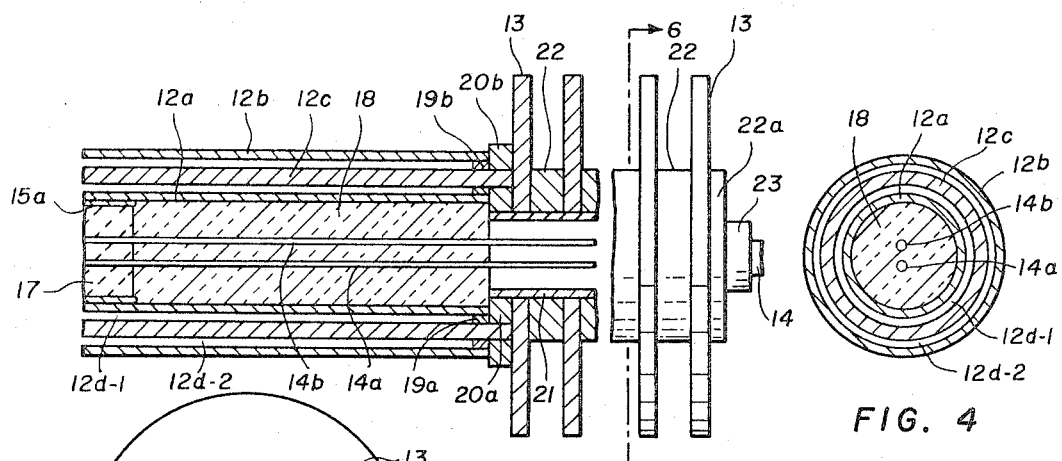
FIG. 5
FIG. 4
FIG. 6
Jack W. Fuller
INVENTOR.
BY John C. Stahl
ATTORNEY

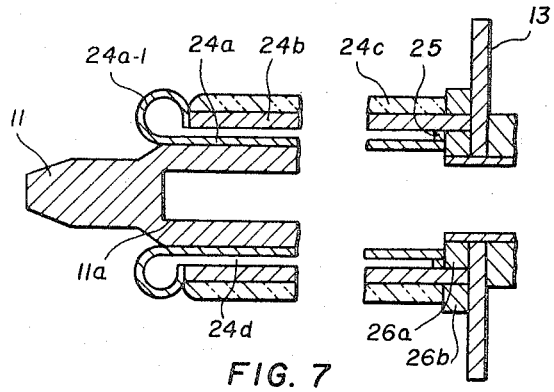
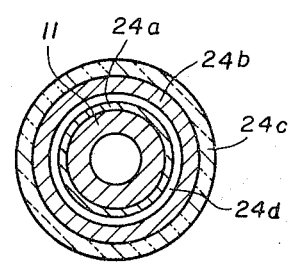
FIG. 7  FIG. 8
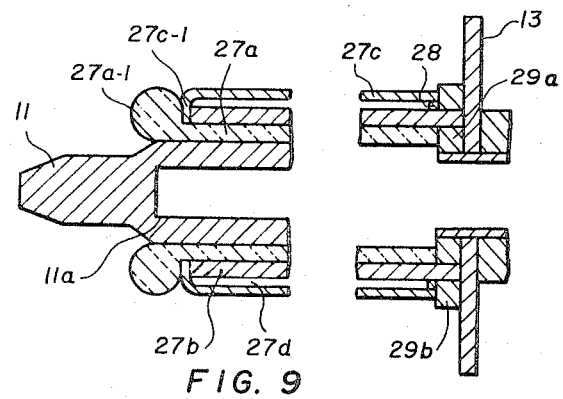
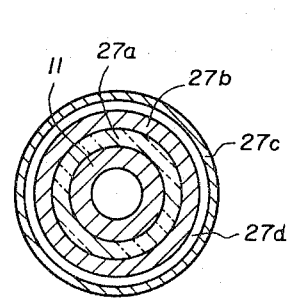
FIG. 9  FIG. 10
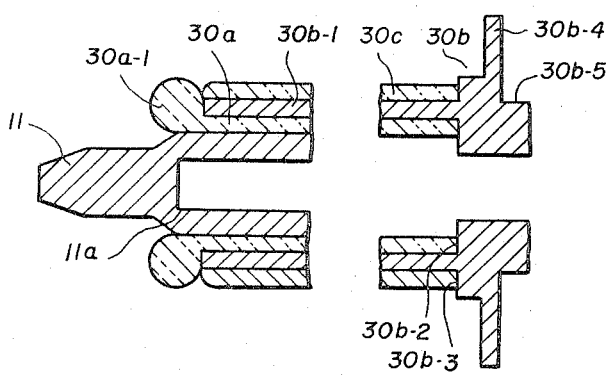
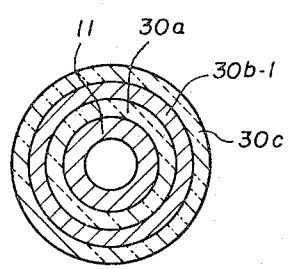
FIG. 11  FIG. 12

United States Patent Office 3,336,462
Patented Aug. 15, 1967

3,336,462
ELECTRIC SOLDERING IRON HAVING A
THERMALLY INSULATED HANDLE
Jack W. Fuller, 142 Continental,
San Antonio, Tex. 78228
Filed Aug. 26, 1964, Ser. No. 392,134
3 Claims. (Cl. 219—227)

The present invention relates to an improved soldering iron and more particularly to a soldering iron which includes a vacuum jacket for minimizing heat transfer from the soldering tip to the handle.

At the present time, when using a conventional soldering iron, it is often difficult to work in very limited spaces and in hard to reach places under the chassis of a piece of electronics equipment or the like, without burning insulating materials or damaging other electrical components.

The soldering iron of the subject invention includes all the advantages of prior art devices without the attendant disadvantages. More specifically, the soldering iron of this invention includes a relatively large soldering tip and heating element, thereby providing a large heat capacity at the tip. The user is able to grasp the device near the soldering tip since heat transfer is effectively diminished by incorporating a portion of the tip and the heating coil in a vacuum jacket, said jacket provides theoretically maximum insulation with minimum space. Furthermore, any heat which may be transmitted by radiation and conduction is passed to heat dissipating fins in the terminal portion of the device at a rate at least equal to the rate of heat transfer from the tip, thereby maintaining a comfortable handling temperature on the handle in proximity to the soldering tip. Such improved device has proven especially applicable for use in medium duty work such as is often encountered in electronics, electrical work and the like.

An object of the present invention is the provision of a soldering iron wherein the heat is confined to the soldering tip for more efficient use.

Another object is to provide such a soldering iron wherein the heat transfer from the tip and heating element to the handle is minimized.

A further object of the invention is the provision of a device which enables the user to have better control over the work, without damaging other portions of the article undergoing construction or repair.

A final object of the present invention is the provision of such a soldering iron which is simple in construction, inexpensive to manufacture, capable of mass production techniques, and universal in its adaptability.

Other objects and features of the invention will become apparent to those skilled in the art as the disclosure is made in the following detailed description of preferred embodiments of the invention as disclosed in the accompanying sheets of drawings in which:

FIG. 1 is a side elevational view, partly broken away, of the preferred embodiment of the invention.

FIG. 2 is an enlarged, vertical sectional view of the foremost portion of the embodiment of FIG. 1 taken along the longitudinal axis of the device.

FIG. 3 is an enlarged, sectional view taken on the line 3—3 of FIG. 1 looking in the direction of the arrows.

FIG. 4 is an enlarged, sectional view taken on the line 4—4 of FIG. 1 looking in the direction of the arrows.

FIG. 5 is an enlarged, side elevational view, partly broken away and partly in section, showing the rearmost portion of the embodiment of FIG. 1.

FIG. 6 is a sectional view taken on the line 6—6 of FIG. 5 looking in the direction of the arrows.

FIG. 7 is a fragmentary, longitudinal, vertical sectional view, partly broken away, showing a modification of the invention.

FIG. 8 is a vertical sectional view, transverse to the longitudinal axis of the device, taken through the foremost portion thereof.

FIG. 9 is a fragmentary, longitudinal, vertical sectional view, partly broken away, showing another modification of the invention.

FIGURE 10 is a vertical sectional view, transverse to the longitudinal axis of the device, taken through the foremost portion thereof.

FIG. 11 is a fragmentary, longitudinal, vertical sectional view, partly broken away, showing another embodiment of the invention; and FIG. 12 is a vertical sectional view, transverse to the longitudinal axis of the device, taken through the foremost portion thereof.

Referring now to the drawings, wherein like reference characters designate like or corresponding parts throughout the several views, there is shown in FIG. 1 of the drawings a soldering iron 10 which consists, in general, of soldering tip 11, a handle 12, heat dissipating fins 13, and a cord 14 which contains electrical leads $14a$–$14b$ (see FIG. 5) which are adapted for connection to a conventional 110 volt alternating current electrical outlet.

The handle 12, as best seen in FIGS. 2 and 5 of the drawings, includes an inner cylindrical sleeve $12a$, composed of stainless steel or other oxidation resistant material of low thermal conductivity, which is of uniform diameter and terminates forwardly in an outwardly turned bead $12a$–1. A cylindrical sleeve $12b$, preferably of stainless steel, includes an inwardly turned flange $12b$–1; flange $12b$–1 is connected to bead $12a$–1 in any conventional manner which provides a seal suitable for use at reduced pressures. A cylindrical member $12c$, of copper or other metallic material having high thermal conductivity, is connected in like manner to the joint thus formed to afford maximum heat transfer to the dissipating fins 13, hereinafter to be described in detail. Member $12c$ thus forms chambers $12d$–1—$12d$–2, which chambers are evacuated to a reduced pressure.

In the preferred embodiment of the invention, the sleeves $12a$, $12b$ are approximately 0.006 inch in thickness and the chambers $12d$–1, $12d$–2 approximately 0.03 inch. All facing surfaces of the stainless steel and copper are brightly polished prior to assembly. Also, the bead $12a$–1 of FIG. 2 and the bead $24a$–1, hereinafter to be described in connection with FIG. 7, are constructed in such a manner that the heat path from the soldering tip 11 to the handle 12 is as long as possible.

Element 15, preferably composed of stainless steel or other heat resistant metal, is hollow, of integral construction, and includes a cylindrical portion $15a$, a reduced intermediate portion which includes male threaded portions $15b$ on the outer surface thereof, and a forwardly extending cylinder $15c$ of slightly reduced diameter. Cylindrical portion $15a$ inserts in and is secured to the inner surface of sleeve $12a$ as by Heliarc welding, silver soldering, or the like.

The soldering tip 11, heretofore mentioned, is preferably of copper or the like and as best seen in FIG. 2, includes an elongate, cylindrical bore $11a$ which terminates rearwardly in female threaded portions $11b$. The tip 11 is inserted in sleeve $12a$ in such a manner that the bore $11a$ accommodates cylinder $15c$ and female threaded portion $11b$ is threaded onto the corresponding male threaded portion $15b$. An electrical heating coil 16, having an electrically insulating coating, inserts in the cylinder $15c$ and connects to the power supply as by leads $14a$, $14b$. The said leads $14a$, $14b$ pass through cylindrical portion $15a$ and are encased therein in a ceramic composition 17, potting compound or other similar heat resistant material.

Referring now to FIG. 5 of the drawings, the portion of sleeve 12a rearward of cylindrical portion 15a is packed with an insulating material 18, such as glass or asbestos fiber. As heretofore mentioned, sleeve 12c, composed of any material having good heat transfer properties, connects to the heat dissipating fins 13. More particularly, rings 19a–19b, composed of copper, aluminum, or the like, are positioned in the terminal portion of chambers 12d–1, 12d–2, and sealed to the corresponding surfaces of sleeve 12a, member 12c, and sleeve 12b, respectively, in accordance with conventional practices. A bore (not shown) is provided in the sleeves 12a, 12b whereby the said chambers may be evacuated to a pressure in the order of $\frac{1}{10}$ mm. mercury and the said bores sealed.

Ring 20a is connected to the end of sleeve 12a and ring 19a, and the innermost surface of member 12c, while ring 20b is connected to the end of ring 19b and sleeve 12b, and to the outermost surface of member 12c. A metallic tubular member 21 is connected to the innermost surface of ring 20a in a conventional manner; the major axis of member 21 is aligned with respect to the longitudinal axis of the device. A plurality of fins 13 of aluminum or copper are positioned on the member 21, each fin being separated from its adjacent fin by rings 22 of lesser outer diameter than the said fins 13 and composed of aluminum or copper. The heat dissipating fin assembly thus described, or alternatively, one of integral construction, is to provide maximum heat transfer within the said assembly. The terminal ring 22a is welded or otherwise fixedly secured to the member 21 and a plug 23 or the like inserts into the bore of member 21 and is secured thereto; the cord 14 is fixedly secured, in a conventional manner, to said plug.

It is to be understood that the soldering tip 11, element 15, and heating coil 16 described in detail in connection with FIG. 2 of the drawings, may be utilized in the embodiments of FIGS. 7, 9 and 11. Furthermore, the insulating materials and rearmost portion of the device, illustrated in FIG. 5 of the drawings, may be utilized in the other embodiments and modifications of the invention.

There is shown in FIGS. 7 and 8 of the drawings another embodiment of the invention which contains a single vacuum chamber. In this embodiment, the soldering tip 11 and sleeve 24a are constructed substantially in accordance with the principles described in connection with FIGS. 1–6. Also, member 24b, composed of copper or the like, is similar to member 12b of FIG. 2; however, the foremost edge of said member 24b connects, in a conventional manner, to the outwardly turned bead 24a–1 on sleeve 24a to form a vacuum tight seal. An insulating material 24c, such as asbestos, foamed plastic or the like, is placed on the outer surface of member 24b. Ring 25 is sealed to the rearmost portion of sleeve 24a and the innermost surface of member 24b, respectively, to form chamber 24d; said chamber is evacuated in the manner heretofore described. Rings 26a–26b are connected to the innermost and outermost surfaces, respectively, of member 24b adjacent the end thereof; the construction of the rearmost portion of the device has heretofore been discussed in detail in connection with FIG. 5 of the drawings.

In FIGS. 9 and 10 of the drawings the handle includes an innermost sleeve 27a of heat insulating material which accommodates the soldering tip 11 and includes at its foremost end an outwardly turned bead 27a–1. A cylindrical member 27b of copper is positioned on the sleeve 27a and connects to heat dissipating fins 13.

A cylindrical sleeve 27c, preferably of stainless steel, includes an inwardly turned flange 27c–1, said flange 27c–1 is connected to the foremost end of member 27b in any conventional manner which provides a seal suitable for use at reduced pressures; the foremost portion of flange 27c–1 abuts the bead 27a–1.

A ring 28 is sealed to the terminal portion of member 27b and sleeve 27c, respectively, to form a chamber 27d; a bore (not shown) is provided in sleeve 27c and the chamber evacuated to the order of $\frac{1}{10}$ mm. mercury. Rings 29a–29b are connected to the innermost and outermost surfaces, respectively, of member 27b; the remainder of the device is constructed in the manner heretofore described in connection with FIGS. 5 and 9 of the drawings.

Referring now to FIGS. 11 and 12 of the drawings, there is shown a modification of the invention which includes a cylindrical sleeve 30a of a heat insulating material, said sleeve includes an outwardly turned bead 30a–1. An integrally formed, shaped element 30b, preferably of aluminum, includes a forwardly extending cylindrical portion 30b–1 which is positioned on the sleeve 30a, the foremost end thereof abuts the bead 30a–1. A cylindrical sleeve of insulating material 30c, preferably similar in composition to material 24c, is provided on the outer surface of cylindrical portion 30b–1. As best seen in FIG. 11, the element 30b includes shoulders 30b–2—30b–3 which support sleeves 30a and 30c, respectively; the fins 30b–4 are integrally formed and separated by intermediate, reduced portions 30b–5.

In the embodiments of FIGS. 9 and 11, the element 15, heretofore described, is fixedly secured in the sleeve 27a of FIG. 9 and sleeve 30a of FIG. 11, as by a heat resisting adhesive suitable for use with the materials, involved.

It is to be understood, of course, that the foregoing disclosure relates to only preferred embodiments of the invention and that it is intended to cover all changes and modifications of the invention herein chosen for the purposes of the disclosure, which do not constitute departures from the spirit and scope of the invention.

What is claimed is:

1. A soldering iron comprising an elongated handle consisting of first and second concentric sleeves and a cylindrical member, said first and second sleeves and said cylindrical member spaced from each other and approximately coextensive in length, a longitudinal bore in said handle defined by the interior of said first sleeve, at least one end of said bore being open, a soldering tip having a working portion partially positioned in the open end of said bore and extending outwardly from one end of said handle, an electrical heating element located within the bore in said handle and in heat exchange relationship with said soldering tip, a a chamber defined by the space between said first and second sleeves extending substantially the length of and completely around the circumference of said handle, said chamber evacuated to a pressure of at least .1 millimeter of mercury, said cylindrical member positioned in said chamber and composed of a material having a substantially higher heat conductivity than the material of said first and second sleeves, a plurality of heat dissipating fins supported on the end of said handle opposite from which the soldering tip extends, said cylindrical member physically connected to said heat dissipating fins in heat conductive relationship.

2. A soldering iron comprising an elongated handle consisting of first and second spaced sleeves and a cylindrical member, said first and second sleeves and said cylindrical member approximately coextensive in length, a longitudinal bore in said handle defined by the interior of said first sleeve, at least one end of said bore being open, a soldering tip partially positioned in the open end of said bore and extending outwardly from one end of said handle, an electrical heating element located within the bore in said handle and in heat exchange relationship with said tip, said cylindrical member positioned between said first and second sleeves to form first and second chambers, said first and second chambers evacuated to a pressure of at least .1 millimeter of mercury, said cylindrical member composed of a material having a substantially higher heat conductivity than the material of said first and second sleeves, and a plurality of heat dissipating fins exteriorly of said chambers and supported on the end of the handle opposite from which the soldering tip extends and physically connected to said cylindrical member in heat conductive relationship.

3. A soldering iron comprising an elongated handle consisting of first and second concentric sleeves and a cylindrical member, said first and second sleeves and said cylindrical member approximately coextensive in length, a longitudinal bore in said handle defined by the interior of said first sleeve, at least one end of said bore being open, a soldering tip having a working portion positioned in the open end of said bore and extending outwardly from one end of said handle, an electrical heating element located within the bore in said handle and in heat exchange relationship with said soldering tip, said first and second sleeves composed of stainless steel, said cylindrical member composed of a material having a substantially higher heat conductivity than stainless steel, said cylindrical member positioned between said first and second sleeves to form first and second chambers, said first and second chambers evacuated to a pressure of at least .1 millimeter of mercury, a plurality of heat dissipating fins exteriorly of said chambers and supported on the end of the handle opposite from which the soldering tip extends, said cylindrical member physically connected to said heat dissipating fins in heat conductive relationship.

References Cited

UNITED STATES PATENTS

| | | | |
|---|---|---|---|
| 1,618,592 | 2/1927 | Jancke | 219—226 |
| 1,714,615 | 5/1929 | Naumann et al. | 219—239 X |
| 1,905,987 | 4/1933 | Lane | 219—236 |
| 1,993,781 | 3/1935 | Hampton et al. | |
| 3,134,884 | 5/1964 | Bean | 219—233 |

FOREIGN PATENTS

| | | |
|---|---|---|
| 399,168 | 7/1924 | Germany. |
| 558,366 | 1/1944 | Great Britain. |

ANTHONY BARTIS, *Primary Examiner.*